(12) United States Patent
Li

(10) Patent No.: US 11,159,946 B2
(45) Date of Patent: Oct. 26, 2021

(54) METHOD AND SYSTEM FOR SECURE COMMUNICATION

(71) Applicant: TENDYRON CORPORATION, Beijing (CN)

(72) Inventor: Ming Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 533 days.

(21) Appl. No.: 16/323,516

(22) PCT Filed: Aug. 4, 2017

(86) PCT No.: PCT/CN2017/095991
§ 371 (c)(1),
(2) Date: Feb. 5, 2019

(87) PCT Pub. No.: WO2018/024242
PCT Pub. Date: Feb. 8, 2018

(65) Prior Publication Data
US 2019/0200217 A1     Jun. 27, 2019

(30) Foreign Application Priority Data

Aug. 5, 2016  (CN) .......................... 201610640039.9
Aug. 5, 2016  (CN) .......................... 201610641429.8

(51) Int. Cl.
*H04W 12/50*     (2021.01)
*G06F 21/60*     (2013.01)
(Continued)

(52) U.S. Cl.
CPC ............ *H04W 12/50* (2021.01); *G06F 21/60* (2013.01); *H04W 4/80* (2018.02); *H04W 12/108* (2021.01); *H04W 12/63* (2021.01)

(58) Field of Classification Search
CPC ... H04W 12/50; H04W 12/63; H04W 12/108; H04W 4/80; G06F 21/60; G06F 21/606
See application file for complete search history.

(56) References Cited

U.S. PATENT DOCUMENTS

2007/0106892 A1*  5/2007  Engberg ................ H04L 69/329
                                                      713/168
2007/0118483 A1*  5/2007  Hill ....................... G06K 7/0008
                                                      705/64

(Continued)

FOREIGN PATENT DOCUMENTS

CN      102034063 A      4/2011
CN      102754106 A     10/2012

(Continued)

OTHER PUBLICATIONS

International Patent Application No. PCT/CN2017/095991; Int'l Search Report; dated Nov. 2, 2017; 6 pages.

*Primary Examiner* — Harunur Rashid
(74) *Attorney, Agent, or Firm* — BakerHostetler

(57) ABSTRACT

A method and a system for secure communication are provided, said method including: a first terminal sending a request message to a second terminal, initiating a first time counting according to a preset timing mode when finishing sending the request message (101); the second terminal receiving the request message, and obtaining a response message according to the request message (102); the first terminal sending a response notification message to the second terminal when a value of the first time counting reaches a first value, and initiating a second time counting according to a preset timing mode when finishing sending the response notification message (103); the second terminal receiving the response notification message, and sending a response message to the first terminal (104); the first terminal permitting starting to receive the response message when (Continued)

a value of the second time counting is within an effective threshold of a second value (105).

17 Claims, 4 Drawing Sheets

(51) Int. Cl.
*H04W 12/63* (2021.01)
*H04W 12/108* (2021.01)
*H04W 4/80* (2018.01)

(56) References Cited

U.S. PATENT DOCUMENTS

| | | | |
|---|---|---|---|
| 2010/0295664 A1* | 11/2010 | Kim | H04L 9/003 340/10.41 |
| 2012/0249296 A1* | 10/2012 | Savry | H04L 9/002 340/5.65 |
| 2012/0280794 A1* | 11/2012 | Parrault | H04L 27/2046 340/10.1 |

FOREIGN PATENT DOCUMENTS

| | | |
|---|---|---|
| CN | 102882683 A | 1/2013 |
| EP | 1271420 A2 | 1/2003 |

* cited by examiner

METHOD AND SYSTEM FOR SECURE COMMUNICATION

CROSS-REFERENCE TO RELATED APPLICATION

This application is a US National phase of International Application No. PCT/CN2017/095991, filed on Aug. 4, 2017, which claims priority to Chinese Patent Application No. 201610641429.8 with the title of invention "METHOD AND SYSTEM FOR SECURE COMMUNICATION", filed by Li Ming on Aug. 5, 2016 and Chinese Patent Application No. 201610640039.9 with the title of invention "METHOD AND SYSTEM FOR SECURE COMMUNICATION" filed by Li Ming on Aug. 5, 2016,

TECHNICAL FIELD

The present disclosure relates to a field of electronic technology, and particular to, a method and system for secure communication.

BACKGROUND

In a card reading mechanism of a card reader in the related art, after the card reader sends instruction data to a card during information interaction between the card reader and the card, the card reader waits for receiving response data from the card within a preset Frame Waiting Time (FWT), and processes all data received within the FWT. Under such a circumstance, a third party may hijack and falsify the response data sent by the card to the card reader, and then sends the falsified response data to the card, reader, or, a third party may disguise itself as a card reader to hijack the response data from a card, and then the third party may disguise itself as the card to send the response data to the card reader, i.e., acquiring identity information of the card remotely so as to obtain the authorization of the card reader. If the hijacked response data can be received by the card reader within the FWT, the card reader processes the hijacked response data, which may cause losses to a cardholder. Consequently, the solution that the card reader receives response data within the FWT brings unsafe factors to the information interaction between the card reader and the card.

Therefore, the present technical field urgently needs a new technical solution to solve the above problems.

SUMMARY

The present disclosure aims at solving one of the above problems.

A main objective of the present disclosure is to provide a method for secure communication.

A second objective of the present disclosure is to provide a system for secure communication.

A third objective of the present disclosure is to provide another method for secure communication.

A fourth objective of the present disclosure is to provide another system for secure communication.

To achieve above objectives, technical solutions of the present disclosure are achieved as follows.

A first aspect the present disclosure provides a method for secure communication, including: sending by a first terminal a request message to a second terminal, and initiating a first time counting according to a preset timing mode when finishing sending the request message, the request message at least containing data to be processed; receiving by the second terminal the request message, and obtaining by the second terminal a response message according to the request message; sending by the first terminal a response notification message to the second terminal when a value of the first time counting reaches a first value, and initiating a second time counting according to the preset timing mode when finishing sending the response notification message; receiving by the second terminal the response notification message, and sending by the second terminal the response message to the first terminal; permitting by the first terminal starting to receive the response message when a value of the second time counting is within an effective threshold of a second value, in which the second value indicates a time needed by the second terminal from finishing receiving the response notification message to sending the response message.

A second aspect the present disclosure provides a system for secure communication, including: a first terminal, configured to send a request message to a second terminal and initiate a first time counting according to a preset timing mode when finishing sending the request message, the request message at least containing data to be processed; a second terminal, configured to receive the request message and obtain a response message according to the request message; the first terminal is further configured to send a response notification message to the second terminal when a value of the first time counting reaches a first value and initiate a second time counting according to the preset timing mode when finishing sending the response notification message; the second terminal is further configured to receive the response notification message, and send the response message to the first terminal; the first terminal is further configured to permit starting to receive the response message when a value of the second time counting is within an effective threshold of a second value, in which the second value indicates a time needed by the second terminal from finishing receiving the response notification message to sending the response message.

A third aspect of the present disclosure provides another method for secure communication, including: sending by a first terminal a request message to a second terminal, and initiating a first time counting according to a preset timing mode when finishing sending the request message, the request message at least containing data to be processed; receiving b the second terminal the request message, and obtaining by the second terminal response data according to the data to be processed in the request message; sending by the first terminal a response notification message to the second terminal when a value of the first time counting reaches a first value, and initiating a second time counting according to the preset timing mode when finishing sending the response notification message; receiving by the second terminal the response notification message, and conducting by the second terminal a signing operation on a message to be signed to obtain signature data, and sending by the second terminal a response message to the first terminal, the message to be signed containing the response data and a second value, which indicates a sum of a time needed by the second terminal to analyze the response notification message and a time estimated for conducting the signing operation, and the response message containing the message to be signed and the signature data; receiving by the first terminal the response message, and obtaining a third value acquired by the second time counting when starting to receive the response message; verifying by the first terminal the signature data, and conducting a check on whether the third value matches with the second value, and when the signature data is verified successfully and the check on the third value passes, determining the response message to be a secure response message.

A fourth aspect of the present disclosure provides another system for secure communication, including: a first terminal and a second terminal. The first terminal is configured to send a request message to the second terminal and initiate a first time counting according to a preset timing mode when finishing sending the request message the request message at least containing data to be processed. The second terminal is configured to receive the request message and obtain response data according to the data to be processed in the request message. The first terminal is further configured to send a response notification message to the second terminal when a value of the first time counting reaches a first value and initiate a second time counting according to the preset timing mode when finishing sending the response notification message. The second terminal is further configured to receive the response notification message, and conduct a signing operation on a message to be signed to obtain signature data, and send a response message to the first terminal, and the message to be signed including the response data and a second value, which indicates a sum of a time needed by the second terminal to analyze the response notification message and a time estimated for conducting the signing operation, and the response message includes the message to be signed and the signature data. The first terminal is further configured to receive the response message and obtain a third value acquired by the second time counting when starting to receive the response message; verify the signature data, and conduct a check on whether the third value matches with the second value, and when the signature data is verified successfully and the check on the third value passes, determine the response message to be a secure response message.

It can be seen from the above technical solutions provided in the present disclosure that, the present disclosure provides another method and system for secure communication, the first terminal adopts a method of sending the response notification message to notify the second terminal of sending the response message to it, and verifies the signature data in the response message to make sure that the device sending the response message is the second terminal and the response message is not falsified. The first terminal judges whether a time obtained from its dine counting matches with a time in the received response message, so as to prevent an external device from remotely hijacking and forwarding the response message of the second terminal, thus achieving an aim of avoiding receiving the hijacked or falsified response message, shortening waiting time for the response message after the first terminal sends the request message as well as improving the security and efficiency of information interaction between the first and second terminals.

BRIEF DESCRIPTION OF THE DRAWINGS

In order to give a more clearly illustration of technical solutions of embodiments of the present disclosure, the drawings used in descriptions of embodiments are introduced briefly as the followings. Obviously, the drawings described below are only some embodiments of the present disclosure. Those skilled in the art may obtain other drawings according to these drawing without creative labors.

DETAILED DESCRIPTION

Technical solutions of embodiments of the present disclosure will be described clearly and completely hereafter with reference to drawings of embodiments of the present disclosure. Obviously, the described embodiments are just part of embodiments of the present disclosure but not all the embodiments. All the other embodiments obtained by those skilled in the art on the basis of embodiments of the present disclosure without creative labors will be within the protection scope of the present disclosure.

Hereinafter, embodiments of the present disclosure will be described in detail with reference to the drawings.

Embodiment 1

Figure 1:
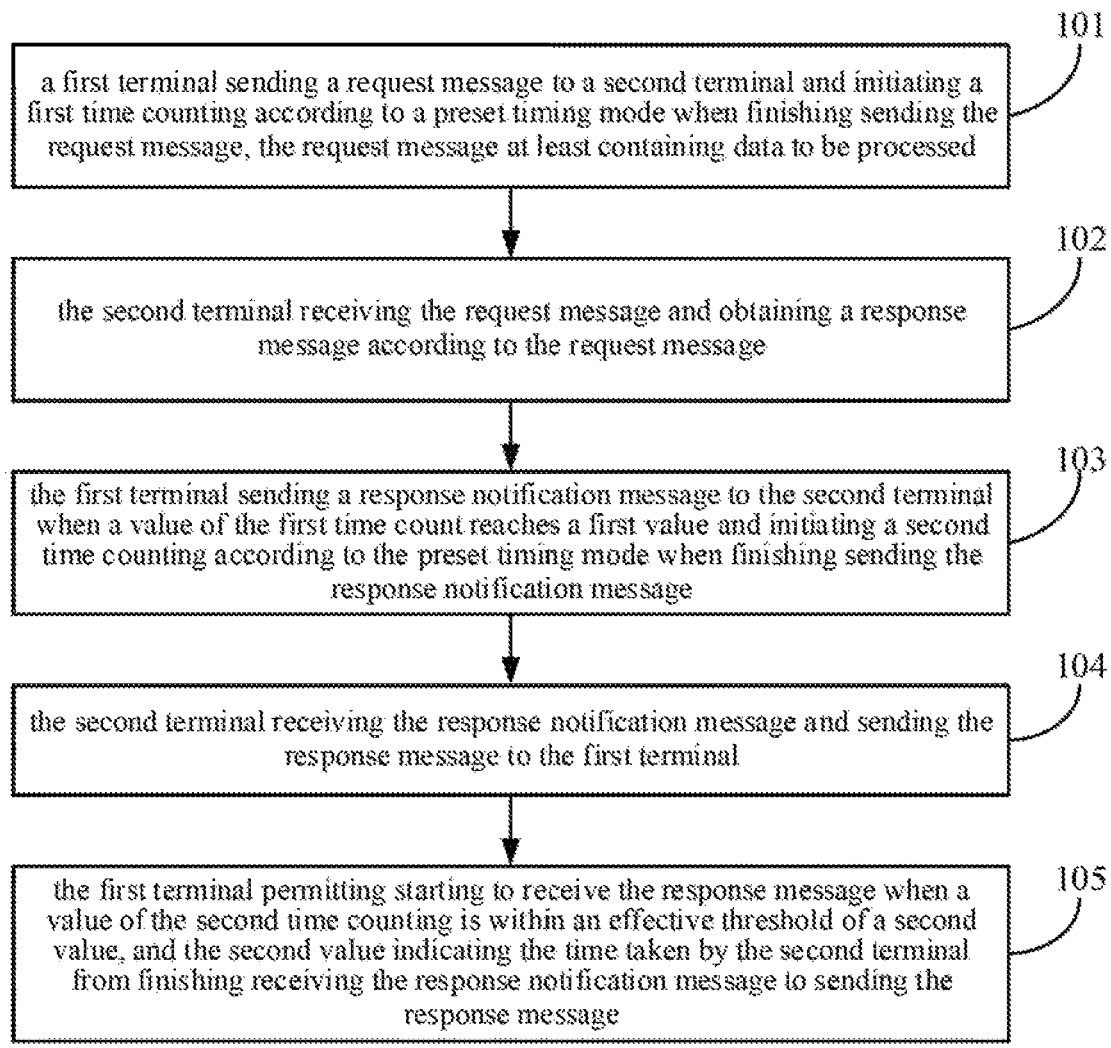
FIG. 1 is a flow chart of a method for secure communication according to embodiment 1 of the present disclosure.

FIG. 1 is a flow chart illustrating a method for secure communication provided in embodiments, of the present disclosure; the method includes the following steps.

In step 101, a first terminal sends a request message to a second terminal and initiates a first time counting according to a preset timing mode when finishing sending the request message. The request message at least contains data to be processed.

The first terminal may be a reader, for example, a card reader, a computer, a tablet computer, a mobile phone or other devices; the second terminal may be a transponder, for example, a smart card, an electronic signature token (key), a device combining an electronic signature token and a card, a mobile phone, an identity card or other devices.

In an alternative implementation of the present embodiment, communication methods adopted by the first and second terminals may include a short-distance wireless communication method, which may include communication methods obeying the following communication protocols: Bluetooth communication protocol, IrDA infrared communication protocol, RFID communication protocol, Zigbee communication protocol, Ultra WideBand communication protocol, Near Field Communication (NFC) communication protocol, WiMedia communication protocol, GPS communication protocol, DECT communication protocol, Wireless 1394 communication protocol, ISO14443 protocol, ISO 15693 protocol and dedicated wireless communication protocol. Certainly, the following communication protocols that may appear in the future are equal to the above communication protocols: under a maximum transmission distance supported by the communication protocol, the time taken to transmit data is less than the time taken for the data to be falsified by an external device.

In an alternative implementation of the present embodiment, before step 101, the method may also include a step of establishing a handshake communication between the first terminal and the second terminal. When the first terminal is a card reader and the second terminal is a smart card or an identity card, the method may further include a card searching procedure of the first terminal and the second terminal.

In the present embodiment, the request message may be a message generated by the first terminal, or a mess d by the first terminal and generated by an authentication device such as a backend server. When the request message is generated by the first terminal, the risk of the request message being hijacked and falsified may be avoided, thus guaranteeing a security of the request message. When the request message is generated by the authentication device such as the backend server, the amount of computation of the first terminal is reduced such that the authentication device is prevented from verifying the falsified t message and a security information interaction is improved.

In step 102, the second terminal receives the request message and obtains as response message according to the request message.

In an alternative implementation of the present embodiment, the second terminal processes according to data to be processed in the request message to obtain response data. The response message at least contains the response data. The data to be processed and the response data may be a plurality of messages, for example the data to be processed may be an identity verification request and the response data may be identity verification response and so on.

In an alternative implementation of the present embodiment the second terminal obtains the use message according to the request message as follows. The second terminal obtains the response data according to the data to be processed in the request message and signs data to be signed to obtain signature data, in which the data to be signed contains the response data and the response message at least contains the response data and the signature data. In the present alternative implementation, the second terminal may use a built-in private key in the second terminal to sign the response data, thus enabling the first terminal to judge whether a real sender the response message is the second terminal according to whether the re data is verified successfully, further guaranteeing the security of the response message.

In an alternative implementation of the present embodiment, the request message also contains a random number. The second terminal obtains the response message according to the request message as follows. The second terminal obtains the response data according to the data to be processed in the request message and signs data to be signed to obtain signature data, in which the data to be signed contains the response data and the random number, and the response message at least contains the response data and the signature data. In the present alternative implementation, the second terminal may use the built-in private key in the second terminal to sign the data to be signed, and the first terminal may judge whether the real sender of the response message is the second terminal according to whether the signature data is verified successfully, in which the data to be signed contains the random number and the response data sent by the first terminal, such that the signature data of each information interaction between the first and second terminals varies from each other, thus preventing a third party from launching a replay attack after hijacking data of the previous information interaction.

In step 103, the first terminal sends a response notification message to the second terminal when a value of the first time count reaches a first value and initiates a second time counting according to the preset timing mode when finishing sending the response notification message.

In an alternative implementation of the present embodiment, the first value is greater than or equal to a third value, which indicates a time taken by the second terminal to obtain the response message according to the request message. The third value may be pre-stored in the first terminal, or the first terminal obtains the third value by negotiating with the second terminal before sending the request message to the second terminal, alternatively, the third value may be less than the FWT the current communication protocol, so that the present implementation may be compatible with the current communication, protocol, thus guaranteeing a normal communication between the first and second terminals under the current communication protocol. In the present alternative implementation, the first terminal sends the response notification message to the second terminal when or after the second terminal obtains the response data by processing a message to be processed, which may make sure that when the first terminal sends the response notification message to the second terminal, the second terminal has obtained the response message, thus avoiding a communication or response failure resulted from that the response message is not yet obtained by the second terminal when the response notification message is sent by the first terminal, and improving communication efficiency. Alternatively, the first terminal and the second terminal may obtain the third value for only one time in processing a complete information interaction process, or the first terminal, in a complete information interaction process, obtains the third value every time before the first terminal sends the request message. Obtaining the third value for only one time in a complete information interaction process may reduce steps in the information interaction process and improve communication efficiency, and obtaining the third value every time before the first terminal sends the request message may improve the accuracy of the time of sending the response notification message controlled by the first terminal and further guarantee the communication security.

In step 104, the second terminal receives the response notification message and sends the response message to the first terminal.

In step 105, the first terminal permits starting to receive the response message when a value of the second time counting is within an effective threshold of a second value, and the second value indicates the time taken by the second terminal from finishing receiving the response notification message to sending the response message.

In an alternative implementation of the present embodiment, the effective threshold of the second value is [T, T+2t], where (T) is the second value, (T+2t) is less than or equal to the FWT set by a communication protocol adopted by the first terminal to communicate with the second terminal, (T) may also be less than or equal to the FWT set by the communication protocol adopted by the first terminal to communicate with the second terminal, and t is the time needed for the response notification message or the response message transmitting the maximum communication distance supported by the communication protocol adopted by the first and second terminals. The first and second terminals, for example, adopt ISO14443 or ISO15693 communication protocol when they are in communication. If the FWT set by the protocol is 30 ms, then the second value (T) is less than 30 ms and the maximum value (T+2t) of the effective threshold of the second value is also less than or equal to 30 ms, such that it make sure that the first terminal receives the response message sent by the second terminal on the premise of provisions of the protocol. In the present alternative implementation, the time taken by the second terminal to receive the response notification message and send the response message varies due to factors like different types or computing powers of the second terminal. The stronger computing power the second terminal has, the smaller the second value (T) is. (t) can be calculated as follows: supposing that the maximum communication distance supported by the communication protocol adopted by the first terminal and the second terminal is (L) and the speed for signal transmission is (C), then t=L/C. The specific value of (t) may be stored in factory setting of the first terminal, or stored in the communication protocol adopted by the first and second terminals when they are in communication. The preset threshold scope during which the first terminal permits receiving the response message should be less than or equal to a sum of time (T) needed by the second terminal from finishing receiving the response notification message to sending the response message, transmission time (t) of the response notification message and transmission time (t) of the response message. When the distance between the first terminal and the second terminal is close enough, the value of (t) is, negligible, i.e., the effective threshold of the second value should be greater than or equal to (T) and be less than or equal to (T+2t). Moreover, when the transmission speed of the communication protocol adopted by the second terminal is fast enough, the computing power of the second terminal is strong enough and the distance between the first terminal and the second terminal is close enough, values of (T) and (t) are in nanoseconds. There may be a situation that when the first terminal receives the response message, the value of the second time counting is less than the minimum unit of the time counting of the first terminal, i.e., the first terminal starts to receive the response message when the value of the second time counting reaches 0.

In the present technical solution, in a case of the short-distance wireless communication, the time needed for data transmission under the maximum transmission distance supported by the communication protocol is less than the time needed for data to be falsified by an external device. Consequently, the time for the falsified response message to be sent to the first terminal will be greater than the effective threshold of the second value, and since the first terminal will not receive the response message beyond the effective threshold of the second value, the first terminal will not receive the falsified response message, i.e., a strict calculation and control on the time for the first terminal to receive the response message ensure the security of the response message and avoid the risk that the first terminal receives and processes the falsified response message.

In an alternative implementation of the present disclosure, when the response message includes the signature data, the method in the present implementation may further include step 106, in which the first terminal verifies the signature data after the first terminal finishes receiving the response message, and if the signature data are verified successfully, the first terminal determines the response message to be a reliable response message. The first terminal verifies the signature data and determines whether the real sender of the response message is the second terminal according to a result of verifying the signature data, which further improves the communication security.

In an alternative implementation of the present embodiment, the second value may be pre-stored in the first terminal, or, the second value may be negotiated by the first terminal with the second terminal before sending the request message to the second terminal.

As an alternative implementation of the present embodiment, the first terminal and the second terminal may obtain the second value for only one time in processing a complete information interaction process, or the first terminal, in a complete information interaction process, obtains the second value every time before the first terminal sends the request message. Obtaining the second value for only one time in a complete information interaction process may reduce steps in the information interaction process and improve communication efficiency, and obtaining the second value every time before the first terminal sends the request message may improve the accuracy of the time of receiving the response message controlled by the first terminal and further guarantee the communication security.

In an alternative implementation of the present embodiment, before step 101, the first terminal determines whether the second value is smaller than a preset safe threshold. If the second value is smaller than the preset safe threshold, then step 101 is executed; if the second value is greater than the preset safe threshold, then the first terminal chooses other communication methods. In some embodiments, since the second value is not an actual time taken by the second terminal to receive the response notification message and send the response message but simply an estimated time, when the estimated time is far greater than the actual time, there may be the situation that before the value of the first time counting of the first terminal enters the effective threshold of the second value, the second terminal sends the response message to the first terminal but the first terminal cannot receive the response message, or there may be the situation that when an external device hijacks and falsifies the response message and the external device sends the falsified response message to the first terminal, the value of the second time counting of the first terminal is still within the effective threshold of the second value, which may bring risks to data interaction. Consequently, a safe threshold value should be preset for the first terminal, and when the second value is less than the preset safe threshold value, the present solution is adopted, which may give attention to the communication efficiency without compromising the security; when the second value is greater than the preset safe threshold value, other solutions with a higher level of security would be adopted, i.e. the first terminal choosing the communication method on the basis of the time taken by the second terminal from finishing receiving the response notification message to sending the response message may further improve the communication efficiency and security of the first terminal.

As an alternative implementation of the present disclosure, methods to obtain the second value and the third value by the first terminal may be identical, or different, for example: both the second value and the third value are pre stored in the first terminal; or, both the second value and third value are negotiated by the first terminal with the second terminal before sending the request message to the second terminal; or, the second value is pre-stored in the first terminal, and the third value is negotiated by the first terminal with the second terminal before sending the request message to the second terminal, and the second value is pre-stored in the first terminal; or, the third value is pre-stored in the first terminal, and the second value is negotiated by the first terminal with the second terminal before sending the request message to the second terminal. Methods to obtain the second value and third value may change adaptively according to the device type of the first terminal 301 and/or the second terminal 302, which may improve the communication efficiency.

In an alternative implementation of the present embodiment, the first terminal pre-storing the second value and/or the third value includes but is not limited to the following implementations: way 1, the first terminal may be designed with the second value and/or the third value of one or more kinds of second terminals before leaving the factory, and before sending the request message to the second terminal, the first terminal obtains the device type of the second terminal and finds the right second value and/or third value by matching; way 2, before communicating with the second terminal, the first terminal obtains the second value and/or the third value via other devices, for example, by downloading from the Internet the second value and/or the third value matched with the second terminal, or, the user of the first terminal inputs the second value and/or the third value via an input device of the first terminal.

In an alternative implementation of the present embodiment, the first terminal negotiating with the second terminal to obtain the second value and/or the third value includes but is not limited to the followings.

Way 1, the first terminal generates and sends a negotiation request and a first random number to the second terminal; the second terminal receives the negotiation request and the first random number, signs the first random number with a private key of the second terminal to obtain signature data of the first random number, generates a second random number, and then sends the signature data of the first random number, a certificate of the second terminal and the second random number to the first terminal; the first terminal receives the signature data of the first random number, the certificate of the second terminal and the second random number, and verifies the signature data of the first random number and the certificate of the second terminal respectively, and signs the second random number with a private key of the first terminal to obtain signature data of the second random number if the signature data of the first random number and the certificate of the second terminal are verified successfully, and then sends the signature data of the second random number and a certificate of the first terminal to the second terminal; the second terminal receives the signature data of the second random number and the certificate of the first terminal, verifies the signature data of the second random number and the certificate of the first terminal, obtains the second value and/or the third value nature data of the second random number and the certificate of the first terminal are verified successfully, and encrypts the second value and/or the third value with a public key of the first terminal to generate ciphertext of the second value and/or the third value and send the ciphertext of the second value and/or the third value to the first terminal; the first terminal receives to ciphertext of the second and/or the third value and then decrypts the ciphertext of the second value and/or lire third value with the private key of the first terminal to obtain the second value and/or the third value.

Way 2, the first terminal generates a negotiation request and a first random number, and sends the negotiation request, the first random number and a certificate of the first terminal to the second terminal; the second terminal receives the negotiation request, the first random number and the certificate of the first terminal and verifies the certificate of the first terminal, and if the certificate of the first terminal is verified successfully, signs the first random number with a private key of the second terminal to obtain signature data of the first random number, generates a second random number, encrypts the second random number with a public key of the first terminal to obtain ciphertext of the second random number, and then sends the ciphertext of the second random number; a certificate of the second terminal and the signature data of the first random number to the first terminal; the first terminal receives the ciphertext of the second random number, the certificate of the second terminal and the signature data of the first random number, verifies the certificate of the second terminal and the signature data of first random number respectively, and if they are verified successfully, decrypts the ciphertext of the second random number with the a key of the first terminal to obtain the second random number, signs the second random number with the private key at the first terminal to obtain signature data of the second random number, generates a third random number, and encrypts the third random number with a public key of the second terminal to obtain ciphertext of the third random number, processes the second random number and third random number according a the preset rule to obtain a first transmission private key; and then sends the signature data of the second random number and the ciphertext of the third random number to the second terminal; the second terminal receives the signature data of the second random number and the ciphertext of the third random number, verifies the signature data of the second random number, and if the signature data of the second random number is verified successfully, decrypts the ciphertext of the third random number with the private key of the second terminal to obtain the third random number, and then processes the second random number and third random number according to the preset rule to obtain a second transmission private key; obtains the second value and/or the third value, and encrypts the second value and/or the third value with the second transmission private key to obtain the ciphertext of the second value and/or the third value, and then sends the ciphertext of the second value and/or the third value to the first terminal; the first terminal receives the ciphertext of the second value and/or the third value, and then decrypts the ciphertext of the second, value and/or the third value with the first transmission private key to obtain the second value and/or the third value.

In the above alternative implementations, the fast terminal obtains the second value and/or the third value by negotiating with the second terminal, and the second value and/or the third value may be obtained by the second terminal based on the calculation of information like the type of information interaction, the computing power of the second terminal and the adopted communication protocol, or pre-stored in the second terminal.

In an alternative implementation of the present disclosure, the first terminal initiates the first time counting according to the preset timing mode when finishing sending the request message, and the first terminal initiates the second time counting according to the preset timing mode when finishing sending the response notification message. For example, there may be various preset timing modes.

Mode 1, the first terminal initiates the first time counting with a built-in timer in the first terminal when finishing sending the request message; the first terminal initiates the second time counting with the built-in timer in the first terminal when finishing sending the response notification message; in this mode, the effective threshold of the second value represents a time range. For example, when the second value is 100 μm, and the time taken by the response notification message or the response message to transmit the maximum communication distance supported by the communication protocol adopted by the first and second terminals is 10 μm, the effective threshold of the second value is [100 μm, 120 μm]. The specific implementation of "the first terminal permitting starting to receive the response message using a first frequency band when the value of the second time counting is within the effective threshold of the second value" in step 105 is that the first terminal permits starting to receive the response message when the value of the second time counting is within [100 μm, 120 μm].

Mode 2, the first terminal starts to calculate the number of cycles of a communication carrier when finishing sending the request message; the first terminal starts to calculate the number of cycles of the communication carrier when finishing sending the response notification message; in this mode, the effective threshold of the second value represents a range of the number of cycles. For example, when the second value is 100 cycles, and the variation of cycles that generated when the communication carrier transmits the maximum communication distance supported by the communication protocol adopted by the first and second terminals is 10 cycles, the effective threshold of the second value is [100, 120] cycles. The specific implementation of "the first terminal permitting starting to receive the response message using the first frequency band when the value of the second time counting is within the effective threshold of the second value" in step 105 is that the first terminal permits starting to receive the response message when the number of cycles of the second time counting is within [100, 120].

Mode 3, the first terminal starts to count a pulse number of the communication carrier when finishing sending the request message; the first terminal starts to count the pulse number of the communication carrier when finishing sending the response notification message; in this mode, the effective threshold of the second value represents a range of the pulse number. For example, when the second value is 100 pulses, and the variation of the pulse number that generated when the communication carrier transmits the maximum communication distance supported by the communication protocol adopted by the first and second terminals is 10 pulses, the effective threshold of the second value is [100, 120] pulses. The specific implementation of "the first terminal permitting starting to receive the response message using the first frequency band when the value of the second time counting is within the effective threshold of the second value" in step 105 is that when the pulse number of the second time counting is within [100, 120], the first terminal permits starting to receive the response message.

Mode 4, the first terminal starts to record a first phase difference between a waveform phase of the communication carrier and a first starting phase when finishing sending the request message, in which the first starting phase is a waveform phase of the communication carrier of the first terminal when finishing sending the request message; the first terminal starts to record a second phase difference between the waveform phase of the communication carrier and a second starting phase when finishing sending the request message, in which the second starting phase is a waveform phase of the communication carrier of the first terminal when finishing sending the response notification message; in this mode, the effective threshold of the second value represents a range of the phase difference. For example, when the phase difference of the second value is $\Delta\varphi$, the phase difference generated when the communication carrier transmits the maximum communication distance supported by the communication protocol adopted by the first and second terminals is $\theta$, the effective threshold of the second value is [$\Delta\varphi$, $\Delta\varphi+2\theta$]. The specific implementation of "the first terminal permitting starting to receive the response message using the first frequency band when the value of the second time counting is within the effective threshold of the second value" in step 105 is that when the phase difference of the second time counting is within [$\Delta\varphi$, $\Delta\varphi+2\theta$], the first terminal permits starting to receive the response message.

When initiating the first time counting and the second time counting according to preset timing modes of above modes 1 to 3, since the timing modes are simple, there is no need to make a great change on the present first terminal; and when initiating the first time counting and the second time counting according to the preset timing mode of above mode 4, since the timing based on phase has a higher accuracy than the timing based on cycle or pulse, the response message is more secure. In above modes 2 to 4 of the present alternative implementation, when the first and second terminals are in the process of communication, the first terminal keeps generating the communication carrier signal. In communication technology, the communication carrier signal is an electrical wave generated by an oscillator and transmitted on a communication channel; it is modulated to carry data. The communication carrier signal is a cyclical oscillator signal without modulation. The communication carrier signal may be a sine wave, or a non-sinusoidal wave (for example, a cyclical pulse sequence).

Hereinafter, the specific realization solution of "the first terminal starting to record the first phase difference between the waveform phase of the communication carrier and the first starting phase when finishing sending the request message, in which the first starting phase is the waveform phase of the communication carrier of the first ten final when finishing sending the request message" in mode 4 of the above alternative implementations will be described briefly: the first terminal sets the phase value of the current communication carrier signal to 0 when finishing sending the request message and sets the above value 0 as the first starting phase, and then reads the phase value of the communication carrier signal in real time, thereby obtaining the first phase difference between the waveform phase of the communication carrier signal and the first starting phase in real time; or, the first terminal utilizes an oscillographic component inside the first terminal to detect a current phase of the communication carrier when finishing sending the request message and sets the current phase of the communication carrier as the first starting phase, and then starts to detect the change of the phase difference of the communication carrier signal in real time, thereby obtaining the first phase difference between the waveform phase of the communication carrier signal and the first starting phase in real time. The realization solution of "the first terminal starting to record the second phase difference between the waveform phase of the communication carrier and the second starting phase when finishing sending the request message, in which the second starting phase is the waveform phase of the communication carrier of the first terminal when finishing sending the response notification message" is similar to the above realization solution, which is not described herein.

The change speed of the phase of the communication carrier signal is in positive correlation with the frequency of the communication carrier signal. By detecting the variation difference between the phase at the moment X of the communication carrier signal and the first starting phase, the time interval between the moment X and the moment when the first terminal finishes sending the request message can be accurately recorded on the basis of the variation difference of the phase. For example, when the frequency of the communication carrier signal is v, the time duration of one cycle of it is $$\frac{1}{v},$$

a phase variation in one cycle is 360°, then the tune taken by the phase of the communication carrier signal to change 1° is $$\frac{1}{360v}.$$

Consequently it can be seen that compared with detecting the time interval via measuring the cycle and pulse of the communication carrier signal, detecting the time interval via measuring the phase variation of the communication carrier signal may greatly improve the accuracy of timing.

In the method for secure communication provided by the present embodiment, the first terminal sends the response notification message to the second terminal, the second terminal sends the response message to the first terminal upon receiving the response notification message. The first terminal controls the time for receiving the response message to be within the effective time threshold starting from receiving by the second terminal the response notification message to sending the response message, which guarantees that even though an external device hijacks and falsifies the response message, the external device cannot send the falsified response message to the first terminal within the time during which the first terminal is allowed to receive the response message, thereby achieving the effect of preventing the first terminal from receiving the falsified response message, shortening waiting time for the response message after the first terminal sends the request message and improving the security and efficiency of information interaction between the first and second terminals.

Figure 2:
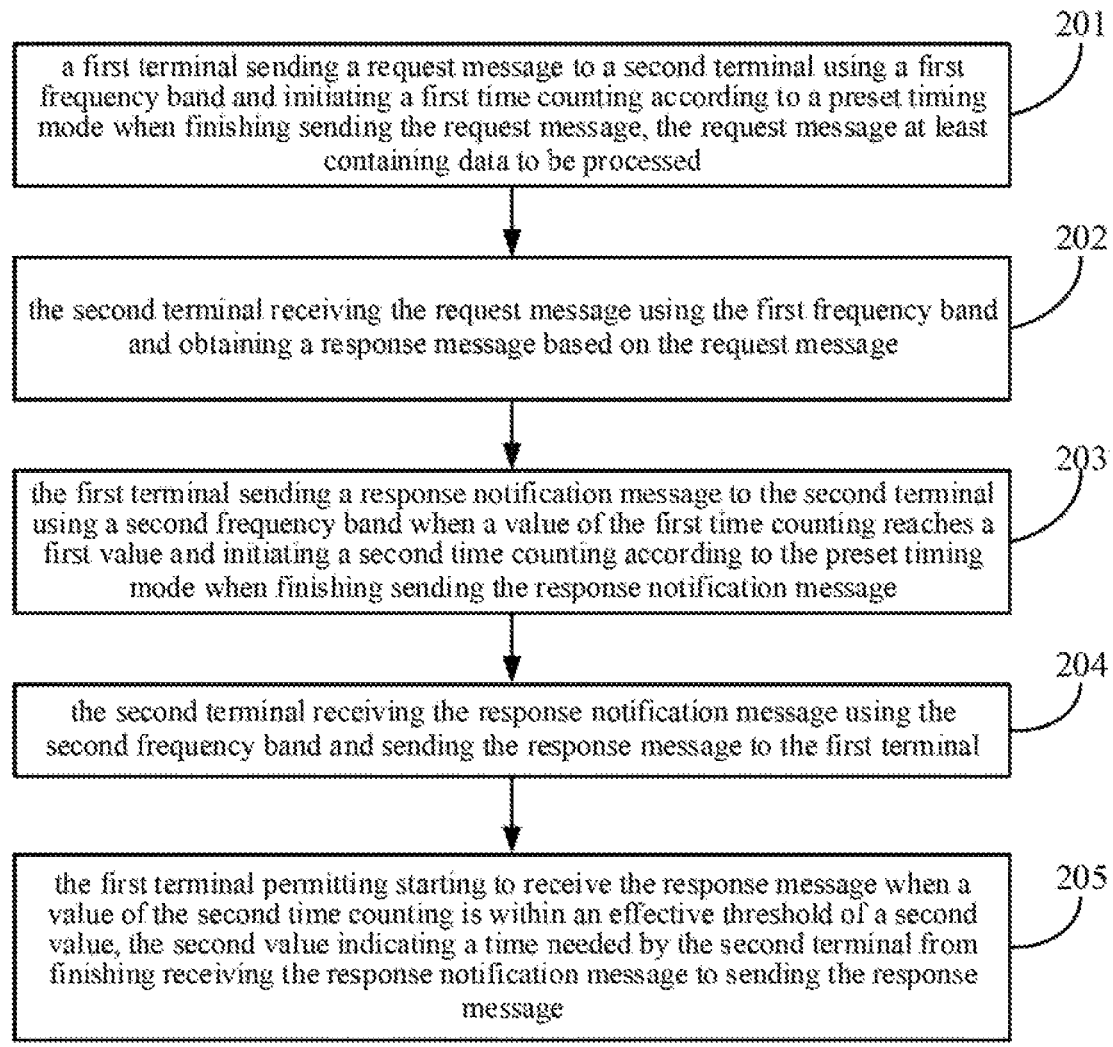
FIG. 2 is a flow chart of another method for secure communication according to embodiment 1 of the present disclosure.

The difference between method embodiments shown in FIG. 2 and FIG. 1 is in that: the first and second terminals adopt different frequency bands to communicate based on types of interactive information. Other realization processes are identical to the above method embodiments, so there will not be any description on the same content. Reference can be made to relevant descriptions of the method embodiment shown in FIG. 1.

FIG. 2 is a flow chart illustrating another method for secure communication provided in embodiments of the present disclosure; the method includes the following steps.

In step 201, a first terminal sends a request message to a second terminal using a first frequency band and initiates a first time counting according to a preset timing mode when finishing sending the request message, in which the request message at least contains data to be processed.

In step 202, the second terminal receives the request message using the first frequency band and obtains a response message based on the request message.

In step 203, the first terminal sends a response notification message to the second terminal using a second frequency band when a value of the first time counting reaches a first value and initiates a second time counting according to the preset timing mode when finishing sending the response notification message.

In step 204, the second terminal receives the response notification message using the second frequency band and sends the response message to the first terminal.

In step 205, the first terminal permits starting to receive the response message when a value of they second time counting is within an effective threshold of a second value, in which the second value indicates a time needed by the second terminal from finishing receiving the response notification message to sending the response message.

In the present embodiment, the first frequency band differs from the second frequency band. For example, the first frequency band is a 13.56 MHZ frequency band and the second frequency band is a 2.4G frequency band, and both the first and second terminals are devices supporting dual-band communication.

In the present embodiment, on the basis of embodiment 1, the first and second terminals send/receive the response notification message by changing the frequency band such that a third party can neither hijack the response notification message within the frequency hand sending the request message, nor obtain the right time of sending the response message, i.e., a third party cannot use a false response message to attack the first terminal when the value of the second time counting of the first terminal enters a range of the effective time threshold, which guarantees the security of the communication device on the basis of guaranteeing the communication security.

Figure 3:
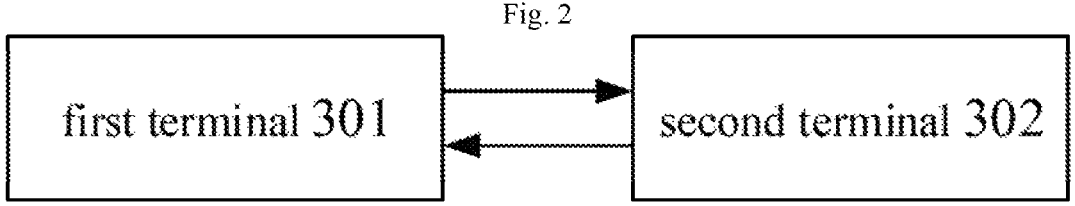
FIG. 3 is a block diagram of a system for secure communication according to embodiment of the present disclosure.

The present embodiment provides a system for secure communication. As shown in FIG. 3, the system for secure communication includes a first terminal 301 and a second terminal 302. In the present embodiment, the first terminal 301 may be a reader, for example, a card reader, a computer, a tablet computer, a mobile phone or other devices, the second terminal 302 may be a transponder, for example, a smart card, an electronic signature token (key), a device combining an electronic signature token and a card, a mobile phone, an identity card or other devices.

The system for secure communication in the present embodiment is applied to perform the above methods for secure communication. Regarding the function realization of the system, reference can be made to relevant descriptions in the above methods. There will not be any description on the same content or similar procedures. A brief description is made as follows.

The first terminal 301 is used for sending a request message to the second terminal 302 and initiating a first time counting according to a preset timing mode when finishing sending the request message, and the request message at least contains data to be processed.

The second terminal 302 is used for receiving the request message and obtaining a response message according to the request message.

The first terminal 301 is further used for sending a response notification message to the second terminal 302 when a value of the first time counting reaches a first value and initiating a second time counting according to the preset timing mode when finishing sending the response notification message.

The second terminal 302 is further used for receiving the response notification message, and the second terminal 302 sends the response message to the first terminal 301.

The first terminal 301 is further used for permitting starting to receive the response message when a value of the second time counting is within an effective threshold a second value, in which the second value indicates a time taken by the second terminal 302 from finishing receiving the response notification message to sending the response message.

Moreover, the first terminal communicates with the second terminal by a short-distance wireless communication method.

Moreover, the effective threshold of the second value is [T, T+2t], where (T) represents the second value, (T+2t) is less than or equal to the FWT set by a communication protocol adopted by the first terminal to communicate with the second terminal, and (t) is a time needed for the response notification message or the response message transmitting a maximum communication distance supported by the communication protocol adopted by the first and second terminals.

Moreover, the first terminal is used for sending the request message to the second terminal by sending the request message to the second terminal using a first frequency band. The second terminal is used for receiving the request message by receiving the request message using the first frequency. The first terminal is further used for sending the response notification message to the second terminal when the value of the first time counting reaches the first value by sending the response notification message to the second terminal using a second frequency hand when the value of the first time counting reaches the first value. The second terminal is further used for receiving the response notification message by receiving the response notification message using the second frequency band. The second terminal is further used for sending the response message to the first terminal by for sending the response message to the first terminal using the first frequency band. The first terminal is further used for permitting starting to receive the response message when the value of the second time counting is within the effective threshold the second value by permitting starting to receive the response message using the first frequency band when the value of the second time counting is within the effective threshold of the second value.

Moreover, the first value is greater than or equal to a third value, which indicates a time needed by the second terminal to obtain the response message according to the request message. The first terminal pre-stores the second value, or, the first terminal is further used for negotiating with the second terminal before sending the request message to the second terminal, such that the first terminal obtains the second value and the third value. The first terminal pre-stores the third value, or, the first terminal is further used for negotiating with the second terminal before sending the request message to the second terminal, such that the first terminal obtains the third value.

Moreover, the request message also contains a random number. The second terminal is further used for obtaining the response message according to the request message by obtaining response data according to data to be processed in the request message and signing data to be signed to obtain signature data, in which the data to be signed contains the response data and the random number, and the response message at least contains the response data and the signature data. Alternatively, the second terminal is further used for obtaining the response message according to the request message by obtaining response data according to data to be processed in the request message and signing data to be signed to obtain signature data, in which the data to be signed contains the response data, and the response message at least contains the response data and the signature data. The system also includes the first terminal which is further used for verifying the signature data when finishing receiving the response message, and if the signature data is verified successfully, determining the response message to be a reliable response message.

Moreover, the first terminal is further for initiating the first time counting according to the preset timing mode when finishing sending the request message by initiating the first time counting with a built-in timer in the first terminal when finishing sending the request message. The first terminal is further used for initiating the second time counting according to the preset timing mode when finishing sending the response notification message by initiating the second time counting with the built-in timer in the first terminal when finishing sending the response notification message. Alternatively, the first terminal is used for initiating the first time counting according to the preset timing mode when finishing sending the request message by starting to calculate a number of cycles of a communication carrier when finishing sending the request message. The first terminal is further used for initiating the second time counting according to the preset timing mode when finishing sending the response notification message by starting to calculate a number of cycles of the communication carrier when finishing sending the response notification message. When the first and second terminals are in the process of communication, the first terminal keeps generating the communication carrier. Alternatively, the first terminal is used for initiating the first time counting according to the preset timing mode when finishing sending the request message by starting to calculate a number of pulses of the communication carrier when finishing sending the request message. The first terminal is further used for initialing the second time counting according to the preset timing mode when finishing sending the response notification message by starting to calculate the number of pulses of the communication carrier when finishing sending the response notification message. When the first and second terminals are in the process of communication, the first terminal keeps generating the communication carrier. Alternatively, the first terminal is used for initiating the first time counting according to the preset timing mode when finishing sending the request message by starting to record a first phase difference between a waveform phase of the communication carrier and a first starting phase when finishing sending the request message, in which the first starting phase is the waveform phase of the communication carrier of the first terminal when finishing sending the request message. The first terminal is further used for initiating the second time counting according to the preset timing mode when finishing sending the response notification message by starting to record a second phase difference between the waveform phase of the communication carrier and a second starting phase when finishing sending the request message, in which the second starting phase is the waveform phase of the communication carrier of the first terminal when finishing sending the response notification message. When the first and second terminals are in the process of communication, the first terminal keeps generating the communication carrier.

From the above technical solutions provided in the present disclosure, it can be seen that the present disclosure provides a method and system for secure communication, the first terminal sends the response notification message to the second terminal, the second terminal sends the response message to the first terminal upon receiving the response notification message. The first terminal controls the time for receiving the response message to be within an effective time threshold starting from receiving by the second terminal the response notification message to sending the response message, which guarantees that even though an external device hijacks and falsifies the response message, it cannot send the falsified response message to the first terminal within the time during which the first terminal may receive the response message, thereby achieving the effect of preventing the first terminal from receiving the falsified response message, shortening waiting time for the response message after the first to sends the request message and improving the security and efficiency of information interaction between the first and second terminals.

Embodiment 2

Figure 4:
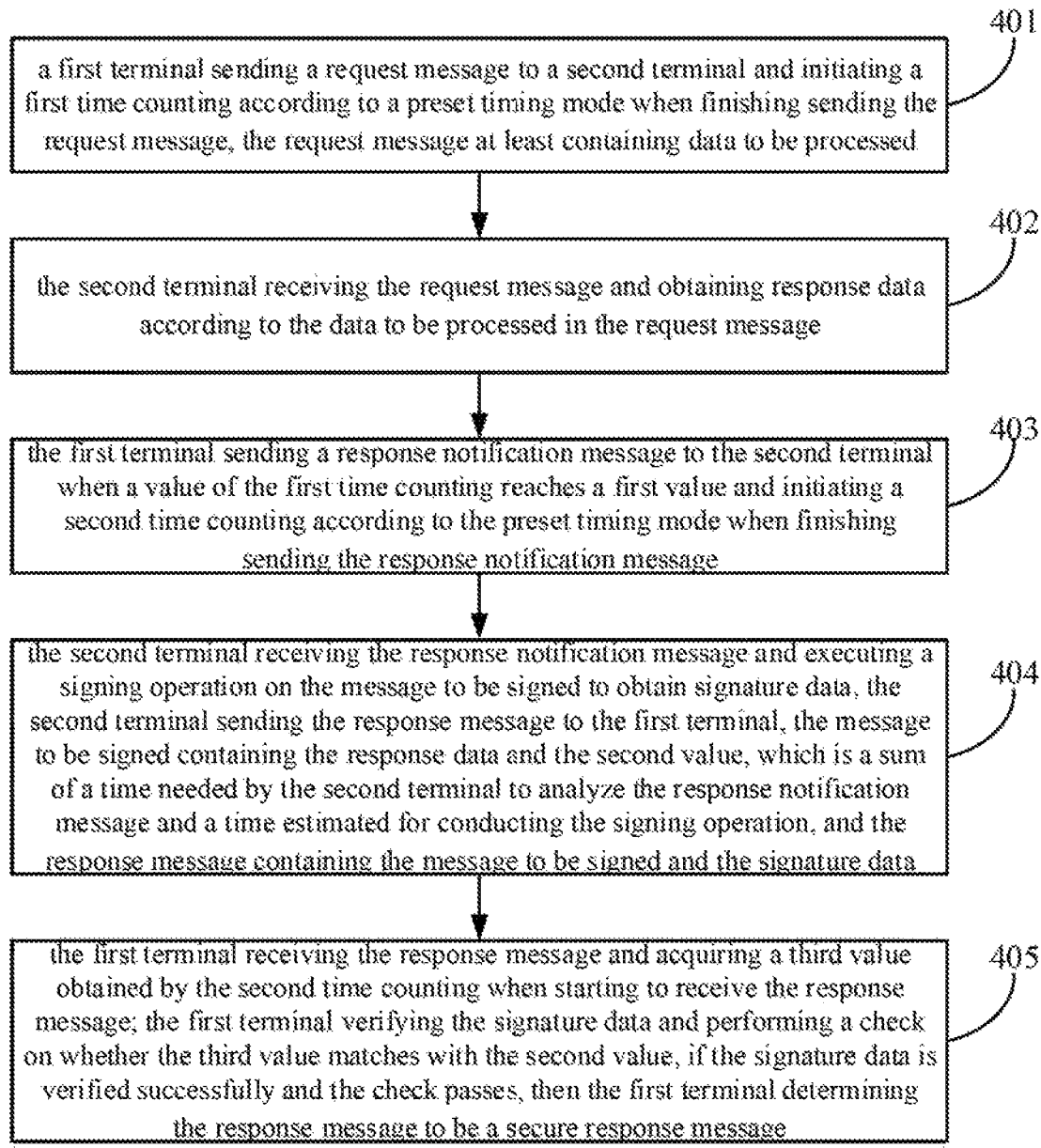
FIG. 4 is a flow chart of a method for secure communication according to embodiment 2 of the present disclosure.

FIG. 4 is a flow chart illustrating a method for Secure communication provided in embodiments of the present disclosure; the method includes the following steps.

In step 401, a first terminal sends a request message to a second terminal and initiates a first time counting according to a preset timing mode when finishing sending the request message, in which the request message at least contains data to be processed.

In an alternative implementation of the present embodiment, the first terminal communicates with the second terminal by a short-distance wireless communication method.

In an alternative implementation of the present embodiment, before step 401, the method may further include steps like establishing a handshake communication between the first and second terminals. When the first terminal is a card reader and the second terminal is a smart card or an identity card, the method may further include a card searching procedure between the first and second terminals.

In step 402, the second terminal receives the request message and obtains response data according to the data to be processed in the request message.

In the present embodiment, the data to be processed and the response data may be various types of messages, for example, the data to be processed may be an identity verification request and the response data may be an identity verification response and so on.

In step 403, the first terminal sends a response notification message to the second terminal when a value of the first time counting reaches a first value and initiates a second time counting according to the preset timing mode when finishing sending the response notification message.

In an alternative implementation of the present embodiment, the first value is greater than or equal to a fourth value, which indicates a time needed to obtain the response data according to the data to be processed in the request message. The fourth value may be pre-stored in the first terminal, or the first terminal obtains the fourth value by negotiating with the second terminal before sending the request message to the second terminal. Alternatively, the fourth value may be less than the FWT in the current communication protocol, so that the present implementation may be compatible with the current communication protocol, thus guaranteeing a normal communication between the first and second terminals under the current communication protocol. In the present alternative implementation, the first terminal sends the response ratification message to the second terminal when or after the second terminal obtains the response data by processing a message to be processed, which may make sure that when the first terminal sends the response notification message to the second terminal, the second terminal has obtained the response data, thus avoiding a response failure resulted from that the response data is yet obtained by the second terminal when the response notification message sent by the first terminal and improving communication efficiency. Alternatively, the first terminal and the second terminal may obtain the fourth value for only one time in processing a complete information interaction process, or the first terminal, in a complete information interaction process, obtains the fourth value every time before the first terminal sends the request message. Obtaining the fourth value for only one time in a complete information interaction process may reduce steps in the information interaction process and improve communication efficiency, and obtaining the fourth value every tinge before the first terminal sends the request message may improve the accuracy of the time of sending the response notification message controlled by the first terminal and further guarantee the communication security.

In the above alternative implementations, the first terminal pre-storing the fourth value includes but is not limited to the following implementations: way 1, the first terminal may be designed with the fourth value of one or more kinds of second terminals before leaving the factory, and before sending the request message to the second terminal, the first terminal obtains the device type of the second terminal and finds the right fourth value by matching; way 2, before communicating with the second terminal, the first terminal obtains the fourth value via other devices, for example, by downloading from the Internet the fourth value matched with the second terminal, or, the user of the first terminal inputs the fourth value via air input device of the first terminal.

In the above alternative implementations, the first terminal negotiating with the second terminal to obtain the fourth value includes but is not limited to the following methods.

Way 1, the first terminal generates and sends a negotiation request and a first random number to the second terminal; the second terminal receives the negotiation request and the first random number, signs the first random number with a private key of the second terminal to obtain signature data of the first random number, generates a second random number, and then sends the signature data of the first random number, a certificate of the second terminal the second random number to the first terminal; the first terminal receives the signature data of the first random number, the certificate of the second terminal and the second random number, verifies the signature data of the first random number and the certificate of the second terminal respectively, and if they are verified successfully, signs the second random with a private key of the first terminal to obtain signature data of the second random number, and then sends the signature data of the second random number and a certificate of the first terminal to the second terminal; the second terminal receives the signature data of the second random number and the certificate of the first terminal, verifies the signature data of the second random number and the certificate of the first terminal, and if they are verified successfully, obtains a fourth value and encrypts the fourth value via a public key of the first terminal to generate ciphertext of the fourth value, and sends the ciphertext of the fourth value to the first terminal; the first terminal receives the ciphertext of the fourth value and then decrypts the ciphertext of the fourth value with the private key of the first terminal to obtain the fourth value.

Way 2, the first terminal generates a negotiation request and a first random number, and sends the negotiation request, the first random number and a certificate of the first terminal to the second terminal; the second terminal receives the negotiation request, the first random number and the certificate of the first terminal, verities the certificate of the first terminal, and if the certificate of the first terminal is verified successfully, signs the first random number with a private key of the second terminal to obtain signature data of the first random number, generates a second random number, and then encrypts the second random number with a public key of the first terminal to obtain ciphertext of the second random number, and then sends the ciphertext of the second random number, a certificate of the second terminal and the signature data of the first random number to the first terminal; the first terminal receives the ciphertext of the second random number, the certificate of the second terminal and the signature data of the first random number, verifies the certificate of the second terminal and the signature data of the first random number respectively, and if they are verified successfully, decrypts the ciphertext of the second random number with a private key of the first terminal to obtain the second random number, and then signs the second random number with the private key of the first terminal to obtain signature data of the second random number, generates a third random number, and encrypts the third random number with a public key of the second terminal to obtain ciphertext of the third random number, processes the second and third random numbers according to a preset rule to obtain a first transmission private key, and then sends the signature data of the second random number and the ciphertext of the third random number to the second terminal; the second terminal receives the signature data of the second random number and the ciphertext of the third random number, verifies the signature data of the second random number, and if the signature data of the second random number is verified successfully, decrypts the ciphertext of the third random number with the private key of the second terminal to obtain the third random number, and then processes the second and third random numbers according to the preset rale to obtain a second transmission private key, obtains the fourth value, and encrypts the fourth value with the second transmission private key to obtain ciphertext of the fourth value, and then sends the ciphertext of the fourth value to the first terminal; the first terminal receives the ciphertext of the fourth value, and then decrypts the ciphertext of the fourth value with the first transmission private key to obtain the fourth value.

In the above alternative implementations, the fourth value may be obtained by the second terminal based on the calculation of information like the type of information interaction, the computing power of the second terminal and the adopted communication protocol, or pre-stored in the second terminal.

In step 404, the second terminal receives the response notification message and executes a signing operation on the message to be signed to obtain signature data. The second terminal sends the response message to the first terminal. The message to be signed contains the response data and the second value, which is a sum of a time needed by the second terminal to analyze the response notification message and a time estimated for conducting the signing operation, and the response message contains the message to be signed and the signature data.

In the present embodiment and the present alternative implementation, the second terminal may use a built-in private key, in the second terminal to sign the message to be signed, which enables the first terminal to determine whether a real sender of the response message is the second terminal according to whether the signature data is verified successfully and to determine whether the response message has been falsified, thus further guaranteeing the security of the response message.

In an alternative implementation of the present embodiment, the time needed by the second terminal to analyze the response notification message is a time estimated for analyzing by the second terminal the response notification message; the second terminal obtains the time needed for analyzing the response notification message in a way of making estimation. The factory setting of the second terminal may pre-store the estimated time for analyzing by the device the response notification message, or the second terminal may estimate the time according to the time needed to analyze the response notification message in the previous time, such that the second terminal does not need to perform a timing operation, thereby easing the amount of computation of the second terminal.

In an alternative implementation of the present embodiment, the second terminal initiates a third time counting according to the preset tinting mode when finishing receiving the response notification message; the second terminal analyzes the response notification message and acquires the time needed to analyze the response notification message obtained by the third time counting when finishing analyzing the response notification message. The second terminal obtains the time needed to analyze the response notification message by timing, such that the second value is more accurate and secure.

In the present embodiment, the second terminal may estimate the time needed to perform the current signing operation according to the time needed to perform the previous signing operation. The factory setting of the second terminal may also pre-store the estimated time needed by the device to perform the signing operation. The second value contains the estimated time needed to perform the signing operation, and the second value is more accurate and secure.

In step 405, the first terminal receives the response message and acquires a third value obtained by the second time counting when starting to receive the response message; the first terminal verifies the signature data and performs a check on whether the third value matches with the second value. If the signature data is verified successfully and the check on the third value passes, then the first terminal determines the response message to be a secure response message.

In the present embodiment, the first terminal verifies the signature data, which may determine whether the second value in the response message has been falsified or whether the sender of the response message is the real second terminal, so as to avoid the situation that an external device hijacks and falsifies the response message but the first terminal still receives and processes the falsified response message, thus improving the communication security between the first and second terminals. The specific operation method of verifying is common knowledge in the art, so there will be no further introduction. It should be noted in the present embodiment, there is no particular order between the operation that the first terminal verifies the signature data and the operation that the first terminal performs the check on whether the third value matches with the second value. The verifying may be accomplished first, or the check on the third value may be accomplished first, or both of them may be accomplished simultaneously.

In an alternative implementation of the present embodiment, there may be a plurality of implementations for performing the check on whether the third value matches with the second value, for example: way 1, the first terminal determines whether the third value is within the effective threshold of the second value, [T, T+2t]. If the third value is within the effective threshold of the second value, then the check on the third value passes successfully, and if the third value is not within the effective threshold of the second value, then the check on the third value fails, where (T) is the second value, (t) is a time needed for the response notification message or the response message transmitting a maximum communication distance supported by a communication protocol adopted by the first and second terminals;

way 2, the first terminal determines whether the second value is within is within the effective threshold of the third value, [S−2t, S]. If the second value is within the effective threshold of the third value, then the check passes successfully, and if the second value is not within the effective threshold of the third value, then the check fails, where (S) is the third value, (t) is a time needed for the response notification message or the response message transmitting the maximum communication distance supported by the communication protocol adopted by the first and second terminals; way 3, the first terminal determines whether a difference between the third value and the second value is within the effective threshold, [0, 2t]. If the difference is within the effective threshold, then the check passes successfully, and if the difference is not within the effective threshold, then the check fails, where t is the time needed for the response notification message or the response message transmitting the maximum communication distance supported by the communication protocol adopted by the first and second terminals.

Hereinafter, the range of the effective threshold will be explained by taking way 1 in the above implementations as an example: a sum of the time needed by the second terminal to analyze the response notification message and the time estimated for performing the signing operation varies due to factors like different types or computing powers of the second terminal. The stronger computing power the second terminal has, the smaller the second value (T) is. (t) can be calculated as follows: supposing that the maximum communication distance supported by the communication protocol adopted by the first terminal and the second terminal is (L) and the speed for signal transmission is (C) then t=L/C. The specific value of (t) may be stored in the factory setting of the first terminal, or stored in the communication protocol adopted by the first and second terminals when they are in communication. The effective threshold scope of the second value should be less than or equal to the sum of time (T) needed by the second terminal to analyze the response notification message and the time estimated for performing the signing operation, and a sum of transmission time (t) of the response notification message and transmission time (t) of the response message. When the distance between the first terminal and the second terminal is close enough, the value of (t) is negligible, i.e., the effective threshold of the second value should be greater than or equal to (T) and be less than or equal to (T+2t). It should be noted that in the present embodiment, when the transmission speed of the communication protocol adopted by the first and second terminals is fast enough, the computing power of the second terminal is strong enough and the distance between the first terminal and the second terminal is close enough, values of the second value and (t) are in nanoseconds. There may be a situation that when the first terminal receives the response message, the third value is less than the minimum unit of the second time counting of the first terminal, the first terminal starts to receive the response message when the value of the second time counting reaches 0.

In the present technical solution in the situation of short-distance wireless communication, the time needed for data transmission under the maximum transmission distance supported by the communication protocol is less than the time needed for data to be falsified by an external device. Consequently, the time for sending the falsified response message to the first terminal will be greater than the effective threshold of the second value, i.e., if the response message is falsified by the external device, the third value will be greater than the effective threshold of the second value, therefore the first terminal may determine the response message to be a dangerous response message. If the real distance between the first and second terminals is longer than a distance supported by the communication protocol, when the external device hijacks the response message of the second terminal in a different place and retransmits it to the first terminal, since the real transmission distance of the response message is longer than the maximum distance supported by the communication protocol and the real transmission time of the response message is longer than (t), the third value will surpass the effective threshold scope of the second value and the first terminal may determine the response message to be a dangerous message, i.e., checking a time included in the response message with the time when the first terminal receives the response message may avoid the risk that the first terminal processes messages hijacked by the external device.

In an alternative implementation of the present disclosure, the first terminal initiates the first time counting according to the preset timing mode when finishing sending the request message and the first terminal initiates the second time counting according to the preset timing mode when finishing sending the response notification message. There may be a plurality of preset timing modes. Specifically, reference can be made to relevant descriptions in embodiment 1, and there will be no further descriptions.

In an alternative implementation of step 404, the second terminal may also conduct a third time counting in a way similar to that of the first terminal conducting the first time counting or second time counting. For example, mode 1, the second terminal initiates the first time counting with a built-in timer in the second terminal when finishing receiving the response notification message; mode 2, the second terminal starts to calculate a number of cycles of a communication carrier when finishing receiving the response notification message; mode 3, the second terminal starts to calculate a number of pluses of the communication carrier when finishing receiving the response notification message; mode 4, the second terminal starts to record a first phase difference between a waveform phase of the communication carrier and a first starting phase when finishing receiving the response notification message, in which the first starting phase is a waveform phase of a communication carrier of the first terminal when finishing sending the request message. Conducting the third time counting by adopting the preset timing mode of mode 1 requires the second terminal to be an active terminal with a crystal oscillator. Conducting the third time counting by adopting the preset timing mode of mode 2 or mode 4 does not require the second terminal to be the active terminal with the crystal oscillator. While conducting the third time counting by adopting the preset timing mode of mode 4, compared with the timing based on cycle or pulse, the timing based on phase has a higher accuracy and the response message is more secure. From modes 2 to 4 in the present alternative implementation, when the first and second terminals are in the process of communication, the first terminal keeps generating the communication carrier signal while the second terminal keeps receiving the communication carrier signal.

Regarding specific realization solution of "the first terminal starting to record the first phase difference between the waveform phase of the communication carrier and the first starting phase when finishing sending the request message, in which the first starting phase is the waveform phase of the communication carrier of the first terminal when finishing sending the request message" in mode 4 in the above alternative implementation, reference can be made to relative descriptions in embodiment 1. There will be no further description herein.

In an alternative implementation of the present embodiment, the first terminal pre-stores a fifth value, or the fifth value is negotiated by the first terminal with the second terminal before sending the request message to the second terminal, the fifth value indicates an estimated time needed by the second terminal from finishing receiving the response notification message to sending the response message. The first terminal determines whether the fifth value is greater than a safe threshold value and a sixth value is the safe threshold value preset by the first terminal. If the fifth value is greater than the safe threshold value, then step 404 is executed; if the fifth value is smaller than the safe threshold value, then the first terminal chooses the following alternative method for communication.

In step A, the first terminal sends the request message to the second terminal and initiates the first time counting according to the preset timing mode when finishing sending the request message, in which the request message at least contains data to be processed; in step B, the second terminal receives the request message and Obtains the response message according to the request message; in step C, the first terminal sends the response notification message to the second terminal when the value of the first time counting reaches a Mth value and initiates the second time counting according to the preset timing mode when finishing sending the response notification message; in step D, the second terminal receives the response notification message and sends the response message to the first terminal; and in step E, the first terminal permits starting to receive the response message when the value of the second time counting is within the effective threshold of an Nth value, where the Nth value indicates the time needed by the second terminal from finishing receiving the response notification message to sending the response message.

It can be seen that in the alternative method for communication, the second terminal does not need a time counting and the first terminal does not need to conduct operations like verifying the response message, so the alternative method for communication is more efficient. However, in the alternative method, the Nth value is not an actual time taken by the second terminal to receive the response notification message and send the response message, but simply an estimated time, when the estimated time is far greater than the actual time, then there may be the situation that before the value of the first time counting of the first terminal enters the effective threshold of the Nth value, the second terminal sends the response message to the first terminal while the first terminal cannot receive the response message, or there may be the situation that when an external device hijacks and falsifies the response message and the external device sends the falsified response message to the first terminal, the value of the second time counting of the first terminal is still within the effective threshold of the Nth value, which may bring risks to data interaction. Consequently, a safe threshold value should be preset for the first terminal, and when the Nth value is less than the preset safe threshold value, the alternative method for communication is adopted, which may give attention to the communication efficiency without compromising the security; and when the Nth value is greater than the preset safe threshold value, the communication method provided in the present embodiment is adopted to improve the security, i.e., the first terminal chooses the communication method on the basis of the time taken by the second terminal from finishing receiving the response notification message to sending the response message, which may further improve the communication efficiency and security of the first terminal.

With the method for secure communication provided m the present embodiment, the first terminal adopts the method of sending the response notification message to notify the second terminal of sending the response message to it, and verifies the signature data in the response message, so as to guarantee that the device sending the response message is the second terminal and the response message is not falsified. The first terminal determines whether the time obtained from its time counting matches with the time in the received response message, thereby preventing an external device from remotely hijacking and forwarding the response message of the second terminal, achieving the aim of avoiding receiving the hijacked or falsified response message, shortening waiting time for the response message after the first terminal sends the request message as well as improving the security and efficiency of information interaction between the first and second terminals.

Figure 5:
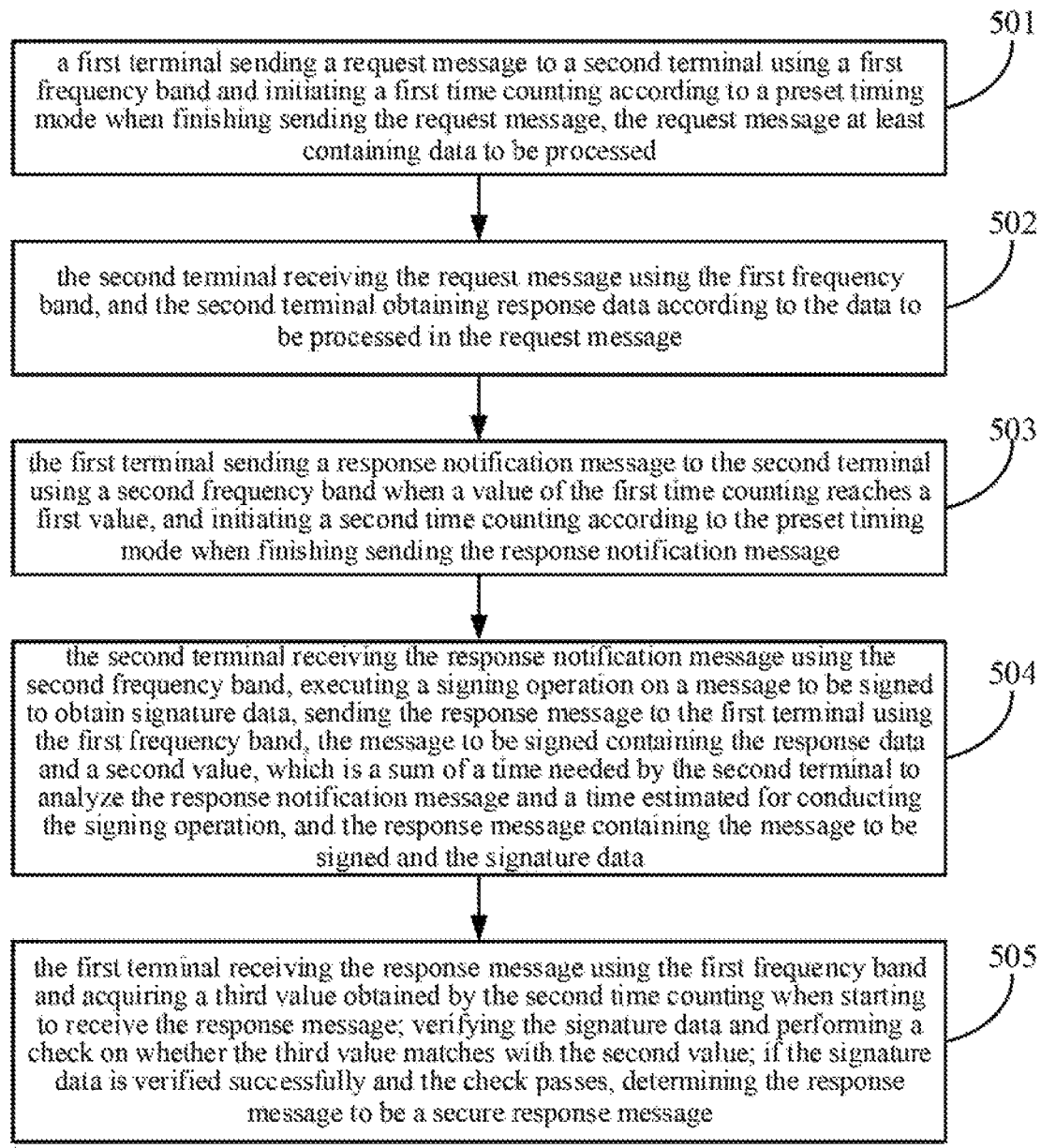
FIG. 5 is a flow chart of another method for secure communication according to embodiment 2 of the present disclosure.

The difference between method embodiments shown in FIG. 5 and in FIG. 4 is in that: the first and second terminals adopt different frequency bands to communicate based on different types of interactive information. Other realization processes are identical to the method embodiments in FIG. 4, so there will nor be any description on the same content. Reference can be made to relevant descriptions of the method embodiment shown in FIG. 4.

FIG. 5 is a flow chart illustrating a method for secure communication provided in embodiments of the present disclosure; the method includes the following steps.

In step 501, a first terminal sends a request message to a second terminal using a first frequency band and initiates a first time counting according to a preset timing mode when finishing sending the request message, in which the request message at least contains data to be processed.

In step 502, the second terminal receives the request message using the first frequency band, and the second terminal obtains response data according to the data to be processed in the request message.

In step 503, the first terminal sends a response notification message to the second terminal using a second frequency band when a value of the first time counting reaches a first value, and initiates a second time counting according to the preset timing mode when finishing sending the response notification message.

In step 504, the second terminal receives the response notification message using the second frequency band, and the second terminal executes a signing operation on a message to be signed to obtain signature data. The second terminal sends the response message to the first terminal using the first frequency band. The message to be signed contains the response data and a second value, which is a sum of a time needed by the second terminal to analyze the response notification message and a time estimated for conducting the signing operation, and the response message contains the message to be signed and the signature data.

In step 505, the first terminal receives the response message using the first frequency band and acquires a third value obtained by the second time counting when starting to receive the response message the first terminal verifies the signature data and performs a check on whether the third value matches with the second value. If the signature data is verified successfully and the check on the third value passes, then the first terminal determines the response message to be a secure response message.

In the present embodiment, the first frequency band differs from the second frequency band. For example, the first frequency band is a 13.56 MHZ frequency band and the second frequency band is a 2.4G frequency band, and both the first and second terminals are devices supporting dual-band communication.

In the present embodiment, on the basis of the method illustrated in FIG. 1, the first and second terminals adopt the method of changing the frequency band to send/receive the response notification message such that a third party can neither hijack the response notification message within the frequency band sending the request message, nor obtain the right time of sending the response message, a third party cannot use a false response message to attack the first terminal when the value of the second time counting of the first terminal enters a range of a preset threshold, or cannot initiate the time counting so as to obtain the second value upon receiving the response notification message, which guarantees the security of the communication device on the basis of guaranteeing the communication security.

The present embodiment provides a system for secure communication which includes a first terminal and a second terminal. The system for secure communication in the present embodiment is used for conducting the method for secure communication illustrated in the method embodiment of FIG. 4 or 5. There will not be any description on the same content or similar procedures. A brief description is made as follows.

The first terminal is used for sending a request message to the second terminal and initiating a first time counting according to a preset timing mode when finishing sending the request message, and the request at least contains data to be processed. The second terminal is used for receiving the request message and obtaining response data according to the data to be processed in the request message. The first terminal is further used for sending tea response notification message to the second terminal when a value of the first time counting reaches a first value and initiating a second time counting according to the preset timing mode when finishing sending the response notification message. The second terminal is further used for receiving the response notification message, conducting a signing operation on a message to be signed to obtain signature data and sending the response message to the first terminal, in which the message to be signed contains the response data and a second value, which is a sum of a time needed by the second terminal to analyze the response notification message and a time estimated for conducting the signing operation, and the response message contains the message to be signed and the signature data. The first terminal is further used for receiving the response message and acquiring a third value obtained by the second time counting when starting to receive the response message, the first terminal verifies the signature data and performs a check on whether the third value matches with the second value. If the signature data is verified successfully and the check on the third value passes, then the lint terminal determines the response message to be a secure response message.

Moreover, the first terminal communicates with the second terminal by a short-distance wireless communication method.

Moreover, the first terminal is further used for performing a check on whether the third value matches with the second value by determining whether the third value is within an effective threshold of the second value [T, T+2t], where (T) represents the second value, and (t) is a time needed for the response notification message or the response message transmitting a maximum communication distance supported by a communication protocol adopted by the first and second terminals.

Moreover, the second terminal is farther used for determining the time needed to analyze the response notification message is a time estimated for analyzing by the second terminal the response notification message. The second terminal is further used for initiating third time counting according to the preset timing mode when finishing receiving the response notification message; the second terminal analyzes the response notification message and acquires the time needed to analyze the response notification message obtained by the third time counting when finishing analyzing the response notification message.

Moreover, the first terminal is used for sending the request message to the second terminal by sending the request message to the second terminal using a first frequency band; the second terminal is used for receiving the request message by receiving the request message using the first frequency. The first terminal is further used for sending the response notification message to the second terminal when the value of the first time counting reaches the first value by sending the response notification message to the second terminal using the second frequency band when the value of the first time counting reaches the first value; the second terminal is farther used for receiving the response notification message by receiving the response notification message using the second frequency band. The second terminal is further used for sending the response message to the first terminal by sending the response message to the first terminal using the first frequency band. The first terminal is further used for receiving the response message by receiving the response message using the first frequency band.

Moreover, the first value is greater than or equal to a fourth value, which indicates a time needed by the second terminal to obtain the response data according to the data to be processed in the request message. The first terminal pre-stores the fourth value, or, the first value is further used for negotiating with the second terminal before sending the request message to the second terminal, such that the first terminal obtains the fourth value.

Moreover, the first terminal is used for initiating the first time counting according to the preset timing mode when finishing sending the request message by initiating the first time counting with a built-in timer in the first terminal when finishing sending the request message. The first terminal is further used for initiating the second time counting according to the preset timing mode when finishing sending the response notification message by initiating the second time counting with the built-in timer in the first terminal when finishing sending the response notification message. Alternatively, the first terminal is used for initiating the first time counting according to the preset timing mode when finishing sending the request message by starting to calculate a number of cycles of a communication carrier when finishing sending the request message. The first terminal is further used for initiating the second time counting according to the preset timing mode when finishing sending the response notification message by starting to calculate the number of cycles of the communication carrier when finishing sending the response notification message. When the first and second terminals are in the process of communication, the first terminal keeps generating the communication carrier. Alternatively, the first terminal is used for initiating the first time counting according to the preset timing mode when finishing sending the request message by starting to calculate a number of pulses of the communication carrier when finishing sending the request message. The first terminal is further used for initiating the second time counting according to the preset timing mode when finishing sending the response notification message by starting to calculate the number of pulses of communication carrier when finishing sending the response notification message. When the first and second terminals are in the process of communication, the first terminal keeps generating the communication carrier. Alternatively, the first terminal is used for initiating the first time counting according to the preset timing mode when finishing sending the request message by starting to record a first phase difference between a waveform phase of the communication carrier and a first starting phase when finishing sending the request message, in which the first starting phase is the waveform phase of the communication carrier of the first terminal when finishing sending the request message. The first terminal is further used for initiating the second time counting according to the preset timing mode when finishing sending the response notification message by starting to record a second phase difference between the waveform phase of the communication carrier and a second starting phase when finishing sending the request message, in which the second starting phase is the waveform phase of the communication carrier of the first terminal when finishing sending the response notification message. When the first and second terminals are in the process or communication, the first terminal keeps generating the communication carrier.

From the above technical solutions provided in the present disclosure, it can be seen that the present disclosure provides a method and system for secure communication, the first terminal adopts the method of sending the response notification message to notify the second terminal of sending the response message to it, and verifies the signature data in the response message, so as to guarantee that the device sending the response message is the second terminal and the response message is not falsified. The first terminal determines whether the time Obtained from its time counting matches with the time in the received response message, thereby preventing an external device from remotely hijacking and forwarding the response message of the second terminal, achieving the aim of avoiding receiving the hijacked or falsified response message, shortening waiting time for the response message after the first terminal sends the request message as well as improving the security and efficiency of the message interaction between the first and second terminals.

Embodiment 2 only describes contents different from embodiment 1 in detail, and for the similar contents there will not be any unnecessary repetition. Reference can be made to relevant descriptions in Embodiment 1.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which may execute functions without obeying the illustrated or discussed order, including executing functions according to related functions in a basically identical method or a contrary order, which should be understood by persons of ordinary skill in the art of embodiments of the present disclosure.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Persons of ordinary skill in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples.

Although embodiments of present disclosure have been shown and described above, it should be understood that above embodiments are just explanatory, and cannot be construed to limit the present disclosure, for those skilled in the art, changes, amendments, alternatives, and modifications can be made to the embodiments without departing from spirit, principles, and scope of the present disclosure. The scope of the present disclosure is limited by the attached claims and its equivalents.

What is claimed is:

1. A method for secure communication, comprising:
   sending by a first terminal a request message to a second terminal, and initiating a first time counting according to a preset timing mode when finishing sending the request message, the request message at least containing data to be processed;
   receiving by the second terminal the request message, and obtaining by the second terminal a response message according to the request message;
   sending by the first terminal a response notification message to the second terminal when a value of the first time counting reaches a first value, and initiating a second time counting according to the preset timing mode when finishing sending the response notification message;

receiving by the second terminal the response notification message, and sending by the second terminal the response message to the first terminal;

permitting by the first terminal starting to receive the response message when a value of the second time counting is within an effective threshold of a second value, wherein the second value indicates a time needed by the second terminal from finishing receiving the response notification message to sending the response message;

wherein the effective threshold of the second value is [T, T+2t], wherein T is the second value, T+2t is less than or equal to a frame waiting time set by a communication protocol adopted by the first terminal to communicate with the second terminal, and t is a time needed for the response notification message or the response message transmitting a maximum communication distance supported by the communication protocol adopted by the first terminal and second terminal.

2. The method according to claim 1, wherein the first terminal communicates with second terminal by a short-distance wireless communication method.

3. The method according to claim 1, wherein, sending by the first terminal the request message to the second terminal comprises: sending by the first terminal the request message to the second terminal using a first frequency band;

receiving by the second terminal the request message comprises: receiving by the second terminal the request message using the first frequency band;

sending by the first terminal the response notification message to the second terminal when the value of the first time counting reaches the first value comprises: sending by the first terminal the response notification message to the second terminal using a second frequency band when the value of the first time counting reaches the first value;

receiving by the second terminal the response notification message comprises: receiving by the second terminal the response notification message using the second frequency band;

sending by the second terminal the response message to the first terminal comprises: sending by the second terminal the response message to the first terminal using the first frequency band;

permitting by the first terminal starting to receive the response message when the value of the second time counting is within the effective threshold of the second value comprises: permitting by the first terminal starting to receive the response message using the first frequency band when the value of the second time counting is within the effective threshold of the second value.

4. The method according to claim 1, wherein, the first value is greater than or equal to a third value, the third value indicating a time taken by the second terminal to obtain the response message according to the request message;

the first terminal pre-stores the second value, or, the first terminal obtains the second value by negotiating with the second terminal before sending the request message to the second terminal;

the first terminal pre-stores the third value, or, the first terminal obtains the third value by negotiating with the second terminal before sending the request message to the second terminal.

5. The method according to claim 1, wherein, obtaining by the second terminal the response message according to the request message comprises: obtaining by the second terminal response data according to the data to be processed in the request message, and signing data to be signed to obtain signature data, wherein the data to be signed contains the response data, the response message at least contains the response data and the signature data;

the method further comprises:

verifying by the first terminal the signature data after receiving the response message, and when the signature data is verified successfully, determining the response message to be a reliable response message.

6. The method according to claim 1, wherein, initiating by the first terminal the first time counting according to the preset timing mode when finishing sending the request message comprises: initiating by the first terminal the first time counting with a built-in timer in the first terminal when finishing sending the request message; initiating by the first terminal the second time counting according to the preset timing mode when finishing sending the response notification message comprises: initiating by the first terminal the second time counting with the built-in timer in the first terminal when finishing sending the response notification message.

7. The method according to claim 1, wherein, the request message further contains a random number; obtaining by the second terminal the response message according to the request message comprises: obtaining by the second terminal response data according to the data to be processed in the request message, and signing data to be signed to obtain signature data, wherein the data to be signed contains the response data and the random number, and the response message at least contains the response data and the signature data;

the method further comprises:

verifying by the first terminal the signature data after receiving the response message, and when the signature data is verified successfully, determining the response message to be a reliable response message.

8. The method according to claim 1, wherein, initiating by the first terminal the first time counting according to the preset timing mode when finishing sending the request message comprises: starting by the first terminal to calculate a number of cycles of a communication carrier when finishing sending the request message; initiating by the first terminal the second time counting according to the preset timing mode when finishing sending the response notification message comprises: starting by the first terminal to calculate the number of cycles of the communication carrier when finishing sending the response notification message; wherein, when the first terminal and second terminal are in a process of communication, the first terminal keeps generating the communication carrier.

9. The method according to claim 1, wherein, initiating by the first terminal the first time counting according to the preset timing mode when finishing sending the request message comprises: starting by the first terminal to calculate a pulse number of a communication carrier when finishing sending the request message; initiating by the first terminal the second time counting according to the preset timing mode when finishing sending the response notification message comprises: starting by the first terminal to calculate the pulse number of the communication carrier when finishing sending the response notification message; wherein, when the first terminal and second terminal are in a process of communication, the first terminal keeps generating the communication carrier.

10. The method according to claim 1, wherein, initiating by the first terminal the first time counting according to the preset timing mode when finishing sending the request message comprises: starting by the first terminal to record a first phase difference between a waveform phase of a communication carrier and a first starting phase when finishing sending the request message, wherein the first starting phase is the waveform phase of the communication carrier of the first terminal when finishing sending the request message; initiating by the first terminal the second time counting according to the preset timing mode when finishing sending the response notification message comprises: starting by the first terminal to record a second phase difference between the waveform phase of the communication carrier and a second starting phase when finishing sending the request message, wherein the second starting phase is the waveform phase of the communication carrier of the first terminal when finishing sending the response notification message; wherein, when the first terminal and second terminal are in a process of communication, the first terminal keeps generating the communication carrier.

11. A system for secure communication, comprising: a first terminal and a second terminal, wherein
the first terminal is configured to send a request message to the second terminal, and to initiate a first time counting according to a preset timing mode when finishing sending the request message, the request message at least containing data to be processed;
the second terminal is configured to receive the request message, and to obtain a response message according to the request message;
the first terminal is further configured to send a response notification message to the second terminal when a value of the first time counting reaches a first value, and to initiate a second time counting according to the preset timing mode when finishing sending the response notification message;
the second terminal is further configured to receive the response notification message, and to send the response message to the first terminal;
the first terminal is further configured to permit starting to receive the response message when a value of the second time counting is within an effective threshold of a second value, wherein the second value indicates a time needed by the second terminal from finishing receiving the response notification message to sending the response message;
wherein the effective threshold of the second value is [T, T+2t], wherein T is the second value, T+2t is less than or equal to a frame waiting time set by a communication protocol adopted by the first terminal to communicate with the second terminal, and t is a time needed for the response notification message or the response message transmitting a maximum communication distance supported by the communication protocol adopted by the first terminal and second terminal.

12. A method for secure communication, comprising: sending by a first terminal a request message to a second terminal, and initiating a first time counting according to a preset timing mode when finishing sending the request message, the request message at least containing data to be processed;
receiving by the second terminal the request message, and obtaining by the second terminal response data according to the data to be processed in the request message;
sending by the first terminal a response notification message to the second terminal when a value of the first time counting reaches a first value, and initiating a second time counting according to the preset timing mode when finishing sending the response notification message;
receiving by the second terminal the response notification message, conducting by the second terminal a signing operation on a message to be signed to obtain signature data, and sending by the second terminal a response message to the first terminal, wherein the message to be signed contains the response data and a second value, the second value indicates a sum of a time needed by the second terminal to analyze the response notification message and a time estimated for conducting the signing operation, and the response message contains the message to be signed and the signature data;
receiving by the first terminal the response message, obtaining a third value acquired by the second time counting when starting to receive the response message; verifying by the first terminal the signature data, and conducting a check on whether the third value matches with the second value, and when the signature data is verified successfully and the check on the third value passes, determining the response message to be a secure response message;
wherein conducting the check on whether the third value matches with the second value comprises:
judging by the first terminal whether the third value is within an effective threshold of the second value, wherein the effective threshold of the second value is [T, T+2t], wherein T is the second value, and t is a time needed for the response notification message or the response message transmitting a maximum communication distance supported by a communication protocol adopted by the first terminal and second terminal.

13. The method according to claim 12, wherein the first terminal communicates with the second terminal by a short-distance wireless communication method.

14. The method according to claim 12, wherein,
the time needed by the second terminal to analyze the response notification message is a time estimated for analyzing by the second terminal the response notification message; or,
the second terminal initiates a third time counting according to the preset timing mode when finishing receiving the response notification message, and the second terminal analyzes the response notification message to obtain the time needed for analyzing the response notification message acquired by the third time counting when finishing analyzing the response notification message.

15. The method according to claim 12, wherein,
sending by the first terminal the request message to the second terminal comprises: sending by the first terminal the request message to the second terminal using a first frequency band;
receiving by the second terminal the request message comprises: receiving by the second terminal the request message using the first frequency band;

sending by the first terminal the response notification message to the second terminal when the value of the first time counting reaches the first value comprises: sending by the first terminal the response notification message to the second terminal using a second frequency band when the value of the first time counting reaches the first value;

receiving by the second terminal the response notification message comprises: receiving by the second terminal the response notification message using the second frequency band;

sending by the second terminal the response message to the first terminal comprises: sending by the second terminal the response message to the first terminal using the first frequency band;

receiving by the first terminal the response message comprises: receiving by the first terminal the response message using the first frequency band.

16. The method according to claim 12, wherein, the first value is greater than or equal to a fourth value, the fourth value indicates a time taken by the second terminal to obtain the response data according to the data to be processed in the request message;

the first terminal pre-stores the fourth value, or, the first terminal obtains the fourth value by negotiating with the second terminal before sending the request message to the second terminal.

17. The method according to claim 12, wherein, initiating by the first terminal the first time counting according to the preset timing mode when finishing sending the request message comprises: initiating by the first terminal the first time counting with a built-in timer in the first terminal when finishing sending the request message; initiating by the first terminal the second time counting according to the preset timing mode when finishing sending the response notification message comprises: initiating by the first terminal the second time counting with the built-in timer in the first terminal when finishing sending the response notification message.

* * * * *